United States Patent
Nichols et al.

(10) Patent No.: US 7,201,358 B2
(45) Date of Patent: Apr. 10, 2007

(54) STAND-ALONE SELF-SUPPORTING DISPOSABLE BAKING CONTAINERS AND METHODS OF MANUFACTURE

(75) Inventors: Monica Stautner Nichols, Richmond, VA (US); Bruce Robbins, Richmond, VA (US); G. Douglas Powell, Richmond, VA (US); Jennifer Danich O'Flynn, Richmond, VA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 11/233,797

(22) Filed: Sep. 23, 2005

(65) Prior Publication Data

US 2006/0068070 A1 Mar. 30, 2006

Related U.S. Application Data

(60) Provisional application No. 60/613,082, filed on Sep. 24, 2004.

(51) Int. Cl.
*A21B 5/00* (2006.01)
(52) U.S. Cl. .......... 249/115; 249/135; 249/DIG. 1; 220/573.1; 220/573.2; 99/426
(58) Field of Classification Search ........ 249/115, 249/135, DIG. 1; 220/573.1, 573.2; 99/426, 99/DIG. 15; 73/379.4; 229/5.82
See application file for complete search history.

(56) References Cited

U.S. PATENT DOCUMENTS

| 85,605 | A | 1/1869 | Musgrove |
|---|---|---|---|
| D33,366 | S | 10/1900 | Gender |
| 1,056,675 | A | 3/1913 | Hill |
| 1,162,427 | A | 11/1915 | Wolff |
| 1,668,101 | A | 5/1928 | Bothe |
| 1,714,379 | A | 5/1929 | Kratz |
| 1,776,358 | A | 9/1930 | Huff |
| 1,864,835 | A | 6/1932 | Lackner |
| 1,864,836 | A | 6/1932 | Lackner |
| 1,918,811 | A | 7/1933 | Huff |
| 1,992,144 | A | 2/1935 | Conti |
| 2,027,296 | A * | 1/1936 | Stuart et al. ............. 206/524.6 |
| 2,296,327 | A | 9/1942 | Barish |
| D134,860 | S | 1/1943 | Dreitzer |

(Continued)

FOREIGN PATENT DOCUMENTS

EP 0 244 372 11/1987

(Continued)

OTHER PUBLICATIONS

NOVACART, Doily/Cakeboard Combination, Jul. 21, 2001, 2 pgs.

(Continued)

*Primary Examiner*—Donald Heckenberg
(74) *Attorney, Agent, or Firm*—Greenberg Traurig, LLP; Paul F. McQuade; James E. Goepel

(57) ABSTRACT

A self-supporting baking mold that includes a base member having a fanciful shape with a perimeter that is more complex than a simple circle and a depending sidewall coupled to said base member. The baking mold is sufficiently rigid to support a quantity of batter without being disposed in a muffin pan or other external supporting structure.

16 Claims, 3 Drawing Sheets

U.S. PATENT DOCUMENTS

| | | | |
|---|---|---|---|
| 2,669,914 A * | 2/1954 | Swaine | 493/167 |
| 2,710,112 A * | 6/1955 | Thompson | 220/573.1 |
| 2,967,652 A | 1/1961 | Canfield et al. | |
| 3,262,668 A * | 7/1966 | Luker | 249/142 |
| D206,338 S | 11/1966 | Levin et al. | |
| 3,349,739 A * | 10/1967 | Griese, Jr. | 72/364 |
| 3,496,896 A * | 2/1970 | Smith | 72/348 |
| 3,828,966 A | 8/1974 | Martin | |
| 3,861,576 A | 1/1975 | Tolaas et al. | |
| 3,877,631 A | 4/1975 | Lai et al. | |
| 4,002,773 A | 1/1977 | Entenmann | |
| D249,112 S | 8/1978 | Garson et al. | |
| 4,114,760 A | 9/1978 | Entenmann | |
| 4,124,160 A | 11/1978 | Meyers et al. | |
| 4,314,650 A | 2/1982 | Cillario | |
| 4,347,934 A | 9/1982 | Goodman | |
| 4,817,801 A | 4/1989 | Schwaikert | |
| D312,400 S | 11/1990 | Schwaikert | |
| 4,986,432 A | 1/1991 | Anghileri | |
| 5,004,121 A | 4/1991 | Howe | |
| 5,094,706 A | 3/1992 | Howe | |
| D325,684 S | 4/1992 | Deare | |
| 5,217,631 A | 6/1993 | Anghileri | |
| 5,226,352 A | 7/1993 | Savage | |
| 5,343,024 A | 8/1994 | Prosise et al. | |
| 5,400,698 A | 3/1995 | Savage | |
| 5,582,389 A * | 12/1996 | Greene | 249/61 |
| 5,721,022 A | 2/1998 | Morita et al. | |
| 5,771,787 A | 6/1998 | Hirano | |
| 6,199,715 B1 * | 3/2001 | Hayes et al. | 220/608 |
| 6,270,003 B1 | 8/2001 | Hirano | |
| D470,712 S | 2/2003 | Swinford et al. | |
| D470,713 S | 2/2003 | Swinford et al. | |
| D471,398 S | 3/2003 | Swinford et al. | |
| 6,544,658 B2 * | 4/2003 | Robbins | 428/458 |
| D478,246 S | 8/2003 | Villano et al. | |
| D478,247 S | 8/2003 | Henry et al. | |
| D478,248 S | 8/2003 | Villano et al. | |
| D478,249 S | 8/2003 | Rocco et al. | |
| D478,250 S | 8/2003 | Henry et al. | |
| D478,466 S | 8/2003 | Henry et al. | |
| D486,992 S | 2/2004 | Henry et al. | |
| 6,684,760 B1 | 2/2004 | Rajusth | |
| D487,211 S | 3/2004 | Henry et al. | |
| D492,539 S | 7/2004 | Henry et al. | |
| D492,540 S | 7/2004 | Henry et al. | |
| D492,541 S | 7/2004 | Henry et al. | |
| 2002/0112614 A1 | 8/2002 | Zoss | |

FOREIGN PATENT DOCUMENTS

| | | |
|---|---|---|
| EP | 0 502 286 A1 | 9/1992 |
| EP | 0 544 973 A1 | 6/1993 |
| GB | 477980 | 8/1935 |
| GB | 2221144 A | 7/1988 |
| JP | 62232329 A | 4/1986 |
| JP | 7149339 A | 4/1988 |
| JP | 10094357 A | 9/1996 |
| WO | WO97/16352 | 5/1997 |
| WO | WO 98/17539 | 4/1998 |

OTHER PUBLICATIONS

NOVACART, Muffin Trays, Jul. 21, 2001, 2 pgs.
NOVACART, Baking Molds, Jul. 21, 2001, 2 pgs.
Doily, Paper Cups and Lace Doilies, Jul. 21, 2001, 2 pgs.

* cited by examiner

US 7,201,358 B2

STAND-ALONE SELF-SUPPORTING DISPOSABLE BAKING CONTAINERS AND METHODS OF MANUFACTURE

CROSS-REFERENCE TO RELATED APPLICATION

This application claims priority under 35 U.S.C. §119(e) to U.S. Provisional Patent Application Ser. No. 60/613,082, filed Sep. 24, 2004 entitled, STAND-ALONE SELF-SUPPORTING DISPOSABLE BAKING CONTAINERS AND METHOD OF MANUFACTURE.

FIELD OF THE INVENTION

The present invention relates to a baking mold and, more specifically, to an individual-sized, self-supporting, shaped baking mold.

BACKGROUND OF THE INVENTION

Generally, there are two types of baking molds structured to produce individual-sized baked goods. First, there are disposable, paper and aluminum foil baking molds that are structured to contain a quantity of batter and which are supported by a separate rigid mold, e.g. cupcake liners disposed in a muffin pan. Generally, these molds have a fluted, cylindrical or conical shape. When made from aluminum foil, such baking cups may be self-supporting and be used without a muffin pan. Second, there are rigid shaped molds for one or more baked goods, generically referred to herein as a "muffin pan," into which batter is poured and baked. The muffin pan may include indentations having fanciful shapes and relief images. Each of these types of baking molds have advantages and disadvantages.

Cupcake liners, for example, provide a barrier between the batter and the supporting muffin pan. Thus, cleaning the muffin pan is typically very easy. Cupcake liners are also inexpensive. A cupcake liner also protects the baked product after cooking is complete. Thus, a person may handle the baked product while touching the cupcake liner and not having to touch the edible product. Another advantage of a cupcake liner is that the liner may, typically, be easily peeled away from the finished baked good.

Cupcake liners are, however, limited to a generally cylindrical or conical shape and have fluted sidewalls. The fluted sidewall is required due to the method of manufacturing cupcake liners. That is, cupcake liners are typically stamped from a sheet of material or, more typically, multiple liners are stamped from multiple sheets at one time using a single punch/die. The sheet of material is typically circular. The punch and die, typically, have a generally flat bottom and a tapered cylindrical shape. The punch has a smaller diameter than the circular sheets of material. As the punch initially engages the sheet of material, the sheet is bent about the bottom of the punch and a sidewall is formed. As the die continues to engage the sheet of material, pressing the material into the die, the sidewall is turned to be about eighty degrees from the plane of the bottom surface. Because the sheet of material has a greater area while flat than in the tapered cylindrical shape, the punch and die have to be shaped to accommodate the additional area of material. One method of accommodating the extra material was to have portions of the sidewall folded over each other in the final shape. These folds on the mold, however, were deep and generally created a noticeable mark, or crease, on a product baked therein. The more common method of accommodating the extra material, however, was to provide a fluted sidewall on the punch and die. As the sheet(s) of material is pressed into the fluted die, the extra material is formed into a fluted sidewall having the same area as the sheet of material but with a much smaller diameter. Thus, a typical cupcake liner cannot have a generally smooth sidewall.

Another disadvantage to using cupcake liners is that the supporting muffin pan has a specific number of cavities, typically six or twelve. Therefore, if a baker made more batter than required to fill a typical muffin pan, e.g. enough batter for thirteen cupcakes, the baker would need to employ a partially filled muffin pan to use up the remaining batter or discard the extra batter. Also, the paper that forms the liner cannot support the batter unless a muffin pan of the same general shape is used. There are some specialty molds made from a corrugated paper which are akin to metal molds, but these molds are much larger than a typical cupcake mold.

Shaped muffin pans, on the other hand, are much more expensive than cupcake liners. While such muffin pans may be reused many times, there is often no need, or a very limited need, to reuse such pans, i.e. a mold having a shape relevant to a singular event such as a specific anniversary or birthday. Additionally, muffin pans that may be reused, such as annual holiday muffin pans, require storage space while only being used a limited number of times per year. Similar to cupcake liners which are used in muffin pans, a muffin pan can only hold a limited amount of batter. Thus, if a baker makes too much batter, the batter must be discarded or baked in a different muffin pan. Unlike cupcake liners, however, a muffin pan is substantially rigid and cannot be peeled away from the baked good. That is, if the baked good adheres to the muffin pan, the baked good is often damaged while being removed from the muffin pan.

Accordingly, there is a need for an inexpensive, self-supporting shaped baking mold. There is a further need for such a self-supporting shaped baking mold to be disposable. There is a further need for such a self-supporting shaped baking mold to be easily removed from the finished baked good. There is a further need for a method of manufacturing such a self-supporting shaped baking mold that is both inexpensive and easy to perform.

SUMMARY OF THE INVENTION

These needs, and others, are met by the present invention which provides a one-piece self-supporting shaped baking mold made from an aluminum foil. The self-supporting shaped baking mold is a semi-rigid structure. That is, the self-supporting shaped baking mold is more rigid than a paper liner but structured to hold the batter during baking without the support of a muffin pan. The self-supporting shaped baking mold, like a cupcake liner, may be removed, possibly destructively, from the finished baked good. Additionally, because the self-supporting shaped baking mold is relatively inexpensive when compared to shaped muffin pans, the self-supporting shaped baking mold is disposable. As such, a user may purchase a limited number of self-supporting shaped baking molds to be used for a single event, after which the self-supporting shaped baking molds are discarded. Such self-supporting shaped baking molds are conveniently used to cook baked goods without the use of a muffin pan. That is, the self-supporting shaped baking molds may be placed directly on an oven rack or a cookie sheet and do not require a muffin pan with a set number of cavities. Because the self-supporting shaped baking molds are not limited by the number of cavities in a muffin pan, a baker may use a number of molds corresponding to the amount of batter. That is, if the baker mixes enough batter for thirteen self-supporting shaped baking molds, the baker simply uses that number of molds and places the final mold on the cookie sheet with all the other molds.

Generally, the self-supporting shaped baking mold has a bowl-like shape, i.e. a base with a depending sidewall defining a cavity. The self-supporting shaped baking mold, however, has a base with a fanciful perimeter shape which extends to the top perimeter of the mold. The fanciful shape may be, but not limited to, a holiday theme item, e.g. a star, tree, pumpkin, ghost, egg, heart, candy cane or shamrock, or an every day item, e.g. a teddy bear, fish, dinosaur, football, or vehicle. The self-supporting shaped baking mold may have an imprint on the bottom surface, but is preferably generally smooth. The self-supporting shaped baking mold, preferably, has a tapered sidewall so that one self-supporting shaped baking mold nests within a similarly shaped self-supporting shaped baking mold. That is, the self-supporting shaped baking mold generally has an upper perimeter that has a greater cross-sectional area than the lower perimeter. With such a shape, multiple self-supporting shaped baking molds may be stacked in a single package. When self-supporting shaped baking molds are stacked together, a paper interleaf may be used to facilitate separation.

The self-supporting shaped baking mold sidewall includes a flange extending outwardly in a plane generally parallel to the plane of the base; whereas a common practice associated with foil products is to curl the distal edge for reinforcement, the self-supporting shaped baking mold has a generally flat edge. In this configuration, the self-supporting shaped baking mold may be easily peeled away from the baked good. Conversely, a mold having a curled edge would be too rigid to be easily pulled away from a baked good.

The self-supporting shaped baking mold is made from a single piece, preferably, a sheet, of aluminum foil. The sheet is cut to have a shape approximating the shape of the finished self-supporting shaped baking mold. By having a shape approximating the shape of the finished self-supporting shaped baking mold, the sheet of material has a reduced amount of extra material that must be accommodated in the die. The self-supporting shaped baking mold is, preferably, made from an alloy suitable for direct food contact. The alloy has a temper suitable for forming the self-supporting shaped baking mold. That is, the self-supporting shaped baking mold is, preferably, made from a foil having a thickness of between about 0.00045 inch to 0.0015 inch. Such a foil may be formed cold, i.e. a sheet of foil may be pressed in a die without having heat added. The foil is drawn around any edges or corners on the die and/or punch, thereby allowing for the unique shapes. The self-supporting shaped baking mold may be formed using an embossed, waffled, or pre-fluted stock, shaped to be formed into a bowl-like shape with a fanciful perimeter in a die press, however, a generally flat foil is preferred. When the generally flat foil is pressed into a die having a fanciful shape, the sidewall has a "wrinkle wall" that is generally flat. Additionally, a foil/polyester laminate may be used to form the self-supporting shaped baking mold, or a combination of a paper base and a foil sidewall may be used.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE PREFERRED EMBODIMENTS

As used herein, the term "semi-rigid" means a structure that maintains its shape under a normal load, e.g., supporting batter, but may be flexed upon the application of additional force. Additionally, as used herein, the term "peel-away" shall mean a structure that is easily unfolded, pulled or torn away when being separated from a substrate, similar to a paper cupcake liner that is easily pulled, unfolded or torn when being removed from a baked good. As used herein, the phrase "baked good" means a final product that is solid which originally was a fluid, such as batter, but may also include chilled products such as gelatin, which also begins as a fluid prior to solidification. As used herein, the word "unitary" shall mean consisting of a single piece. As used herein, the phrase "individual-sized baked goods" shall mean a baked good having a batter volume of between about 1 to 12 fluid ounces, and preferably 3.5 fluid ounces. The term "shaped" shall mean a fanciful shape having a perimeter that is more complex than a simple shape as defined above. As used herein, the phrase "wrinkle wall" means a generally smooth finish on a wall made from a foil which may have fine wrinkles thereon.

Figure 1:
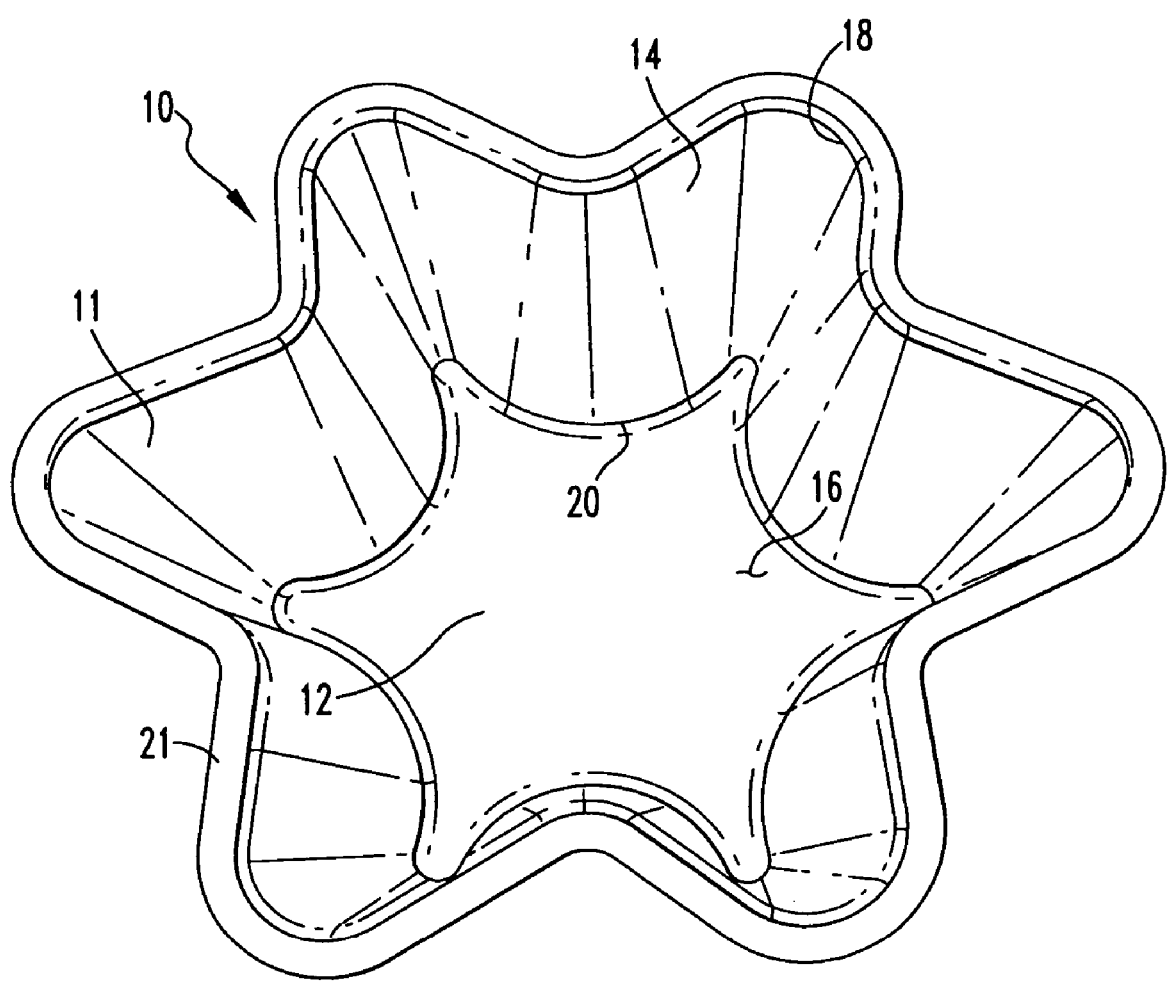
FIG. 1 is an isometric view of the self-supporting shaped baking mold.

As shown in FIG. 1, a self-supporting shaped baking mold 10 has a body 11 with a bowl-like shape having a generally planar base 12 and a sidewall 14. The body 11 is, preferably, a unitary element, folded at the intersection of the base 12 and sidewall 14, forming a cavity 16. The sidewall 14 has a wrinkle wall finish that is generally smooth but which may have fine wrinkles. The wrinkle wall does not include folds or wrinkles deep enough to leave a crease on the finished baked good. The sidewall 14 has a height of between about 0.25 and 2.5 inches, and preferably about 1.25 inches. This may also be referred to as the depth of the cavity 16. The base 12 and sidewall 14 have a fanciful perimeter shape such as the star shape shown in the Figures, however, any shape such as, but not limited to, a holiday theme item, e.g., a star, tree, pumpkin, ghost, egg, heart, candy cane or shamrock, or an every day item, e.g. a teddy bear, dinosaur, fish, football, or vehicle could also be used. The cavity 16 is sized to hold between about 1 to 12 fluid ounces, and preferably 3.5 fluid ounces, of batter. The base 12 and sidewall 14 are generally rigid having enough strength to support the weight of a batter placed within the cavity 16 without significant deformation. The self-supporting shaped baking mold 10 may have an imprint on the bottom surface (not shown), but is preferably generally smooth. As such, the self-supporting shaped baking mold 10 may be placed on an oven rack or cookie sheet during baking.

The self-supporting shaped baking mold 10, preferably, has a shape wherein one self-supporting shaped baking mold 10 nests within a similarly shaped self-supporting shaped baking mold 10. That is, the self-supporting shaped baking mold 10 generally has an upper perimeter 18 that has a greater cross-sectional area than the lower perimeter 20. With such a shape, multiple self-supporting shaped baking molds 10 may be stacked in a single package. When self-supporting shaped baking molds 10 are stacked together, a paper interleaf (not shown) may be used to facilitate separation.

The sidewall 14, preferably, includes a flange 21 at the upper perimeter 18 extending outwardly in a plane generally parallel to the plane of the base 12. The flange 21 is generally planar and does not include a curl at the distal edge. The flange 21 serves several functions including, but not limited to, providing a gripping surface for a user who is separating stacked self-supporting shaped baking molds 10 or for peeling the self-supporting shaped baking mold 10 away from a finished product. The flange 21 also provides structural support that helps maintain the fanciful shape of the self-supporting shaped baking mold 10. The support provided by the flange 21 is, however, significantly less than the support that would be provided by a flange 21 terminating in a curl. The flange 21, if present, has a length between about 1/32 and 1/2 inch, and more preferably about 1/4 inch.

The self-supporting shaped baking mold 10 is made from a generally rigid aluminum foil. The foil used to create the self-supporting shaped baking mold 10 is thin enough so that the self-supporting shaped baking mold 10 is structured to be peeled away from the final product by hand. That is, the foil, preferably, has a thickness of between about 0.00045 and 0.0015 inch, and more preferably about 0.00098 inch. The self-supporting shaped baking mold 10 is, preferably, made from an alloy suitable for direct food contact, such as, but not limited to 8111, 1235, 3003 or other alloys and tempers of O, H19, and other suitable tempers for forming. The alloy has a temper suitable for cold forming the self-supporting shaped baking mold 10. Additionally, a foil/polyester laminate may be used to form the self-supporting shaped baking mold 10. The base 12 and sidewall 14 may be coated with a lubricant to reduce any adherence between the self-supporting shaped baking mold 10 and the product.

Figure 2:
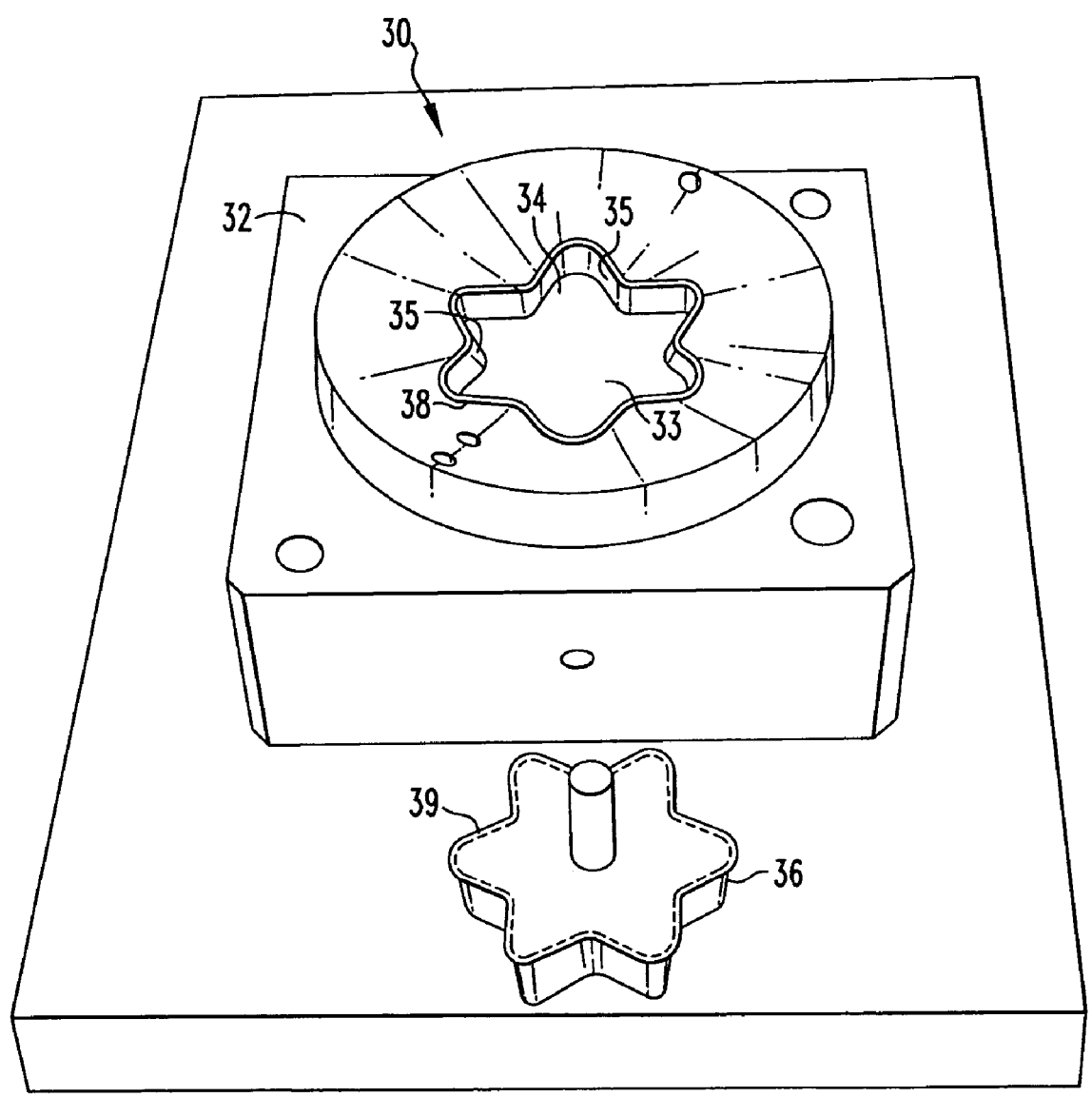
FIG. 2 is an isometric view of a die press.
Figure 3:
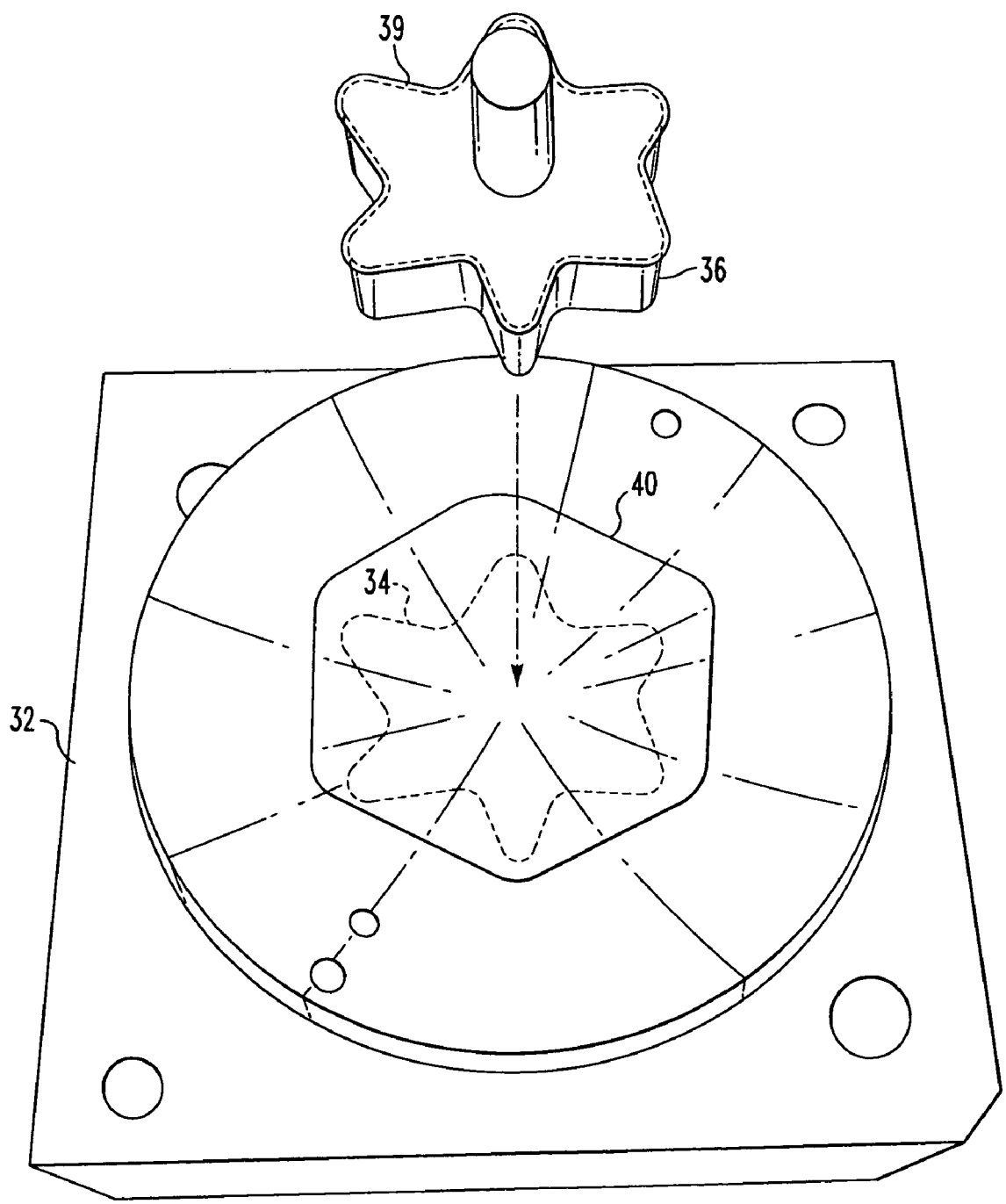
FIG. 3 is another view of the die press.

A unitary sheet of foil 40 having a shape approximating the shape of the finished self-supporting shaped baking mold 10 is formed into the bowl-like shape with a fanciful perimeter in a die press 30, as shown in FIG. 2. That is, the die press 30 has a die 32 with a cavity 34 of the desired fanciful shape and a punch 36 having a corresponding shape. The cavity 34 includes a generally planar, shaped die base wall 33 and a shaped die sidewall 35. Preferably, the shaped die base wall 33 and shaped die sidewall 35 have the same general shape, but may have different shapes. The punch 36 has a shape corresponding to the shape of the cavity 34. Both the die cavity 34 and the punch 36 include a flange portion 38, 39. The flange portions 38, 39 extend in a plane generally parallel to the shaped die base wall 33. As shown in FIG. 3, the aluminum foil sheet 40 is placed in the die 32 and cold formed in the fanciful shape by the punch 36. That is, the punch 36 is moved into the die cavity 34 thereby deforming the foil sheet 40. The aluminum foil sheet 40 is not heated prior to, or during, the pressing operation. As the aluminum foil sheet 40 is pressed into the die 32, the aluminum foil 40 is drawn around the edges and corners of the punch 36 and the die 32. These drawn portions maintain the pressed shape after the aluminum foil stock is removed from the die press 30. Because the sheet of foil 40 has a shape approximating the shape of the finished self-supporting shaped baking mold 10, the final form of the self-supporting shaped baking mold 10 does not include any substantial folds and has a wrinkle wall finish. Additionally, the flange portions 38, 39 of the die cavity 34 and punch 36, form the flange 21 to be generally parallel to the base 12. The method precludes curling the flange 21 and thereby results in a flat flange 21.

While illustrative embodiments of the invention are disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. A self-supporting baking mold comprising:
    a fancifully shaped base member;
    a depending sidewall coupled to said base member; and
    wherein the base member and sidewall form a semi-rigid structure, wherein the base member and the sidewall comprise metal, and wherein the metal is between 0.00045 and 0.0015 inch thick.

2. The self-supporting baking mold of claim 1 wherein, said base member and said sidewall are made from a unitary piece of material.

3. The self-supporting baking mold of claim 1 wherein, said base member and said sidewall are structured to be peeled away from the finished product.

4. The self-supporting baking mold of claim 1 wherein, said base member and said sidewall are made from aluminum.

5. The self-supporting baking mold of claim 4 wherein said aluminum is coated with a lubricant.

6. The self-supporting baking mold of claim 4 wherein said aluminum is about 0.00098 inch thick.

7. The self-supporting baking mold of claim 1 wherein said base member and sidewall define a cavity having a volume of between about 1 to 12 fluid ounces.

8. The self-supporting baking mold of claim 7 wherein said base member and sidewall define a cavity having a volume of about 3.5 fluid ounces.

9. The self-supporting baking mold of claim 1 wherein said sidewall includes an upper perimeter having a flange.

10. The self-supporting baking mold of claim 9 wherein said flange does not have a curl at the distal edge.

11. The self-supporting baking mold of claim 9 wherein said flange has a length of between about 1/32 and 1/2 inch.

12. The self-supporting baking mold of claim 11 wherein said flange has a length of about 1/4 inch.

13. A method of making a self-supporting, fanciful shaped baking mold using a die and a punch, said die having a cavity with a fanciful shaped die base wall and a correspondingly shaped die sidewall, said punch corresponding to the shape of said cavity, said method comprising:
    placing a sheet of aluminum foil in said die, wherein the aluminum foil is between 0.00045 and 0.0015 inch thick, said foil sheet having a shape approximating the shape of the finished self-supporting shaped baking mold; and
    moving said punch into said die cavity thereby deforming said foil sheet, thereby creating a self-supporting baking mold having a fanciful shape.

14. The method of claim 13 wherein said self-supporting shaped baking mold has a wrinkle wall finish.

15. The method of claim 13 wherein said die cavity and said punch include a flange portion, said flange portion extending in a plane generally parallel to the die base wall.

16. The method of claim 13 wherein said step of moving said punch into said die cavity thereby deforming said foil sheet, thereby creating a self-supporting shaped baking mold having a fanciful shape does not include the step of curling the flange.

* * * * *